(12) United States Patent
Choi et al.

(10) Patent No.: US 12,436,795 B2
(45) Date of Patent: Oct. 7, 2025

(54) ELECTRONIC APPARATUS AND METHOD FOR CONTROLLING ELECTRONIC APPARATUS

(71) Applicant: Samsung Electronics Co., Ltd., Suwon-si (KR)

(72) Inventors: Hyungjun Choi, Suwon-si (KR); Heesik Jeon, Suwon-si (KR); Hyoungsu Kim, Suwon-si (KR); Jongyoub Ryu, Suwon-si (KR); Yusun Son, Suwon-si (KR); Dojun Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 18/191,360

(22) Filed: Mar. 28, 2023

(65) Prior Publication Data

US 2023/0236869 A1 Jul. 27, 2023

Related U.S. Application Data

(63) Continuation of application No. PCT/KR2021/011592, filed on Aug. 30, 2021.

(30) Foreign Application Priority Data

Oct. 12, 2020 (KR) .................. 10-2020-0131244

(51) Int. Cl.
G06F 9/45 (2006.01)
G06F 9/455 (2018.01)
G06F 3/16 (2006.01)

(52) U.S. Cl.
CPC .......... *G06F 9/45558* (2013.01); *G06F 3/167* (2013.01)

(58) Field of Classification Search
None
See application file for complete search history.

(56) References Cited

U.S. PATENT DOCUMENTS

| 8,082,153 | B2 | 12/2011 | Coffman et al. |
| 9,032,313 | B2 | 5/2015 | Shiga |

(Continued)

FOREIGN PATENT DOCUMENTS

| JP | 2010-103721 A | 5/2010 |
| KR | 10-2012-0078368 A | 7/2012 |

(Continued)

OTHER PUBLICATIONS

Korean Notice of Allowance dated Mar. 17, 2025, issued in Korean Application No. 10-2020-0131244.

*Primary Examiner* — Craig C Dorais
(74) *Attorney, Agent, or Firm* — Jefferson IP Law, LLP

(57) ABSTRACT

An electronic apparatus is provided. The electronic apparatus includes a microphone, a memory configured to store at least one instruction, and a processor configured to execute the at least one instruction, and the processor may be configured to, by executing the at least one instruction, obtain a first command set corresponding to a first user voice input through the microphone and execute the obtained first command set on a host operating system, based on a user command different from the first user voice being input while the first command set is executed, identify whether it is possible to execute the first command set on a virtual machine through a bridge module, and based on a result of the identification, execute a command on the virtual machine through the bridge module and execute an operation corresponding to the user command on the host operating system.

15 Claims, 9 Drawing Sheets

(56) References Cited

U.S. PATENT DOCUMENTS

| | | |
|---|---|---|
| 9,063,793 B2 | 6/2015 | Kim et al. |
| 9,910,721 B2 | 3/2018 | Wu et al. |
| 10,013,267 B1 * | 7/2018 | Wagner .................... G06F 9/50 |
| 10,127,011 B2 | 11/2018 | Bang et al. |
| 10,534,624 B2 | 1/2020 | Antill et al. |
| 10,768,892 B2 | 9/2020 | Bang et al. |
| 10,846,124 B2 | 11/2020 | Ni et al. |
| 11,099,812 B2 | 8/2021 | Bang et al. |
| 11,188,376 B1 * | 11/2021 | Alexander .......... G06F 9/45558 |
| 11,450,315 B2 | 9/2022 | Kim et al. |
| 2010/0107069 A1 | 4/2010 | Shiga |
| 2012/0297382 A1 | 11/2012 | Kim et al. |
| 2016/0034253 A1 | 2/2016 | Bang et al. |
| 2016/0284351 A1 | 9/2016 | Ha et al. |
| 2016/0372112 A1 * | 12/2016 | Miller .................... H04L 51/066 |
| 2018/0143857 A1 | 5/2018 | Anbazhagan et al. |
| 2019/0012142 A1 | 1/2019 | Bang et al. |
| 2020/0051554 A1 | 2/2020 | Kim et al. |
| 2020/0364028 A1 | 11/2020 | Bang et al. |
| 2021/0216384 A1 | 7/2021 | Vlasyuk et al. |

FOREIGN PATENT DOCUMENTS

| | | |
|---|---|---|
| KR | 10-1348645 B1 | 1/2014 |
| KR | 10-2015-0029197 A | 3/2015 |
| KR | 10-1495862 B1 | 3/2015 |
| KR | 10-2016-0016491 A | 2/2016 |
| KR | 10-1601680 B1 | 3/2016 |
| KR | 10-1748182 B1 | 6/2017 |
| KR | 10-2018-0084392 A | 7/2018 |
| KR | 10-2018-0110975 A | 10/2018 |
| KR | 10-2019-0080990 A | 7/2019 |

* cited by examiner

ELECTRONIC APPARATUS AND METHOD FOR CONTROLLING ELECTRONIC APPARATUS

CROSS-REFERENCE TO RELATED APPLICATION(S)

This application is a continuation application, claiming priority under § 365(c), of an International application No. PCT/KR2021/011592, filed on Aug. 30, 2021, which is based on and claims the benefit of a Korean patent application number 10-2020-0131244, filed on Oct. 12, 2020, in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus that executes various sets of commands on at least one of a host operating system or a virtual machine and a controlling method thereof.

2. Description of Related Art

With the development of voice recognition technology, technology for controlling various devices to perform operation s corresponding to recognized voices have been developed and utilized in various ways. In other words, a user can control various devices and receive corresponding services by inputting the user's voice without inputting a physical interaction (e.g., touch, swipe, or the like) on the screen of a smart phone.

However, in the case of the existing technology, the operation corresponding to a user voice on a smart phone is executed on the foreground and thus, the user cannot use other functions using the smart phone until the corresponding operation is completed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below Accordingly, an aspect of the disclosure is to provide an electronic apparatus that executes a command input from a user on at least one of a host operating system or a virtual machine and a controlling method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a microphone, a memory configured to store at least one instruction, and a processor configured to execute the at least one instruction, and the processor may include, by executing the at least one instruction, obtain a first command set corresponding to a first user voice input through the microphone and execute the obtained first command set on a host operating system, based on a user command different from the first user voice being input while the first command set is executed, identify whether it is possible to execute the first command set on a virtual machine through a bridge module, and based on a result of the identification, execute a command that is not executed on the host operating system from the first command set on the virtual machine through the bridge module and execute an operation corresponding to the user command on the host operating system.

In accordance with another aspect of the disclosure, a method of controlling an electronic apparatus including a microphone is provided. The method includes obtaining a first command set corresponding to a first user voice input through the microphone on a host operating system, based on a user command different from the first user voice being input while the first command set is executed, identifying whether it is possible to execute the first command set on a virtual machine through a bridge module, and based on a result of the identification, executing a command that is not executed on the host operating system from the first command set on the virtual machine through the bridge module and executing an operation corresponding to the user command on the host operating system.

According to various embodiments described above, the electronic apparatus may execute a different command set according to a user input on a virtual machine while executing a command set on a host operating system, making it possible for the user to receive various services at the same time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
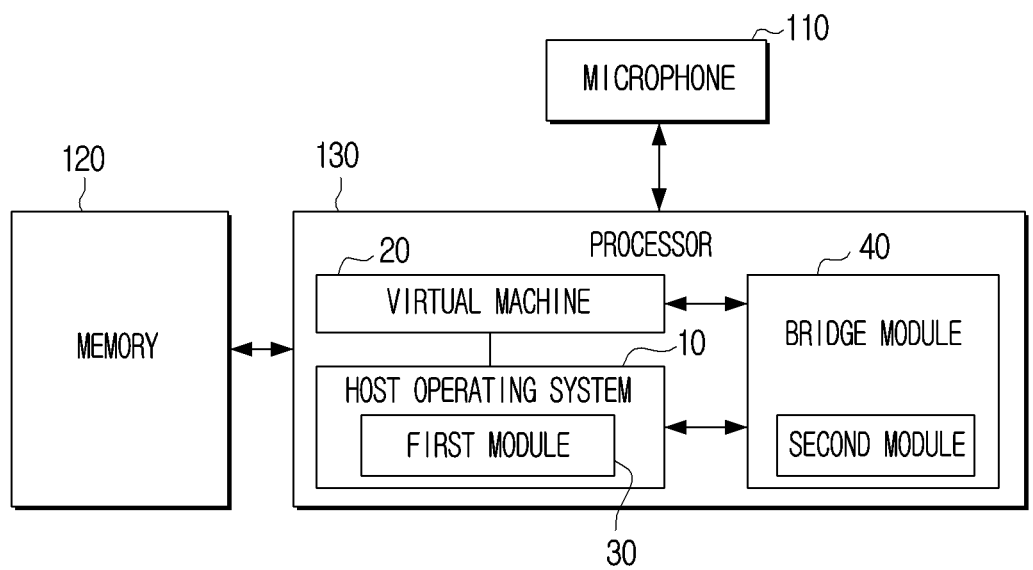
FIG. 1 is a block diagram illustrating configuration of an electronic apparatus briefly according to an embodiment of the disclosure.

FIG. 1 is a block diagram illustrating configuration and operation of an electronic apparatus according to an embodiment of the disclosure.

Referring to FIG. 1, an electronic apparatus 100 may include a microphone 110, a memory 120 and a processor 130. However, the configuration illustrated in FIG. 1 is a view for implementing embodiments of the disclosure, and appropriate hardware or software configurations apparent to those skilled in the art may be further included in the electronic apparatus 100.

In describing the disclosure, the electronic apparatus 100 may be implemented as a user terminal device, such as a smart phone, a tablet personal computer (PC), a wearable device, or the like, but is not limited thereto. The electronic apparatus 100 may be implemented as various devices, such as a desktop PC, a laptop PC, a netbook computer, an artificial intelligence (AI) speaker, or the like.

The microphone 110 is configured to receive a user voice. The microphone 110 may be provided inside the electronic apparatus 100, but this is only an example. Based on the microphone 110 being provided outside the electronic apparatus 100, it may transmit a user voice signal generated through a wired/wireless interface (e.g., wireless fidelity (Wi-Fi) or Bluetooth) to the processor 130.

The memory 120 may store data or at least one instruction elated to at least one another component. The instruction means one action statement that can be directly executed by the processor 130 in a programming language, and is a minimum unit for program execution or operation. The memory 120 is accessed by the processor 130, and data can be read/recorded/modified/deleted/updated by the processor 130.

In the disclosure, the term 'memory' may include a read only memory (ROM) (not illustrated), a random access memory (RAM) (not illustrated) in the processor 130 or a memory card (not illustrated) (e.g., a micro secure digital (SD) card or a memory stick) mounted on the electronic apparatus 100. In addition, the memory 120 may store a program, data, or the like, for configuring various screens to be displayed on the display area of the display.

The memory 120 may include a host operating system 10, a hypervisor and a virtual machine 20.

The host operating system 10 means system software that manages (or controls) hardware on the electronic apparatus 100 and provides a base environment for executing application software. In other words, the host operating system 10 may server as an interface between hardware of the electronic apparatus 100 and application software.

The hypervisor (or a virtual machine manager) is disposed above the host operating system 10, and it means software that controls resources, or the like, provided to the virtual machine 20 so that a guest operating system that is a separate operating system on the virtual machine 20 can be executed. The hypervisor can be installed on the host operating system, but is not limited thereto. The hypervisor can be installed directly on hardware.

The virtual machine 20 refers to a virtualization space in which a computing environment is implemented as software, and a guest operating system is installed on the virtual machine 20. The virtual machine 20 may include an application to be executed based on a resource controlled or provided by the guest operating system and a library necessary for execution of the application.

The memory 120 may include a bridge module 40. The bridge module 40 refers to a software module that monitors or controls a command set executed in either the host operating system 10 or the virtual machine 20, and manages information related to a command set on either the host operating system 10 or the virtual machine 20 or provides the same to either the host operating system 10 or the virtual machine 20. However, this is only an example, and the bridge module 40 may be implemented as a hardware module.

For example, the bridge module 40 may identify whether a command set pre-executed on the virtual machine 20 is present. In addition, the bridge module 40 may provide information related to a first command set on a first application executed on the host operating system 10 on the virtual machine 20. The process that the processor 130 performs various operations through the bridge module 40 will be described later.

The memory 120 may include a first model 30 that is an artificial intelligence model trained to output a command set (or a script) corresponding to an input user voice. The first model 30 may output a text corresponding to a user voice by recognizing the input user voice, and output a command set suitable for the user's intention by understanding the output text.

The first model 30 may be trained by using a command set corresponding to at least one operation corresponding to a user interaction and a user voice corresponding to the command set as training data. The structure of the first model 30 and the training process will be described with reference to FIG. 2.

The front part of the user voice input to the first model 30 may include a wake-up word (or a trigger word) that can activate the first model 30. Activating the first model 30 means the first model 30 is switched from an inactivated state to a state in which a command set (or a script)

corresponding to the user voice input to the microphone 110 can be output. The wake-up word may be pre-registered based on the electronic apparatus 100 being manufactured, and it can be added/modified/deleted by the user.

The memory 120 may store a second model 50 that is an artificial intelligence model trained to output a score indicating the degree of urgency of command set execution.

Based on a command set corresponding to a user voice being input, the second model 50 may be trained to output a score indicating how urgently the command set should be executed. For example, the second model 50 may be trained to output a score indicating the degree of urgency of command set execution based on at least one of the type of command set corresponding to the user voice, the resource of the electronic apparatus 100, or the user's tendency.

For example, based on the type of command set corresponding to a user voice being set as a type that should be processed urgently, the second model 50 may be trained to output a high score. In another example, based on the CPU usage rate among the resources of the electronic apparatus 100 exceeding a predetermined value or the battery charging amount is equal to or less than a predetermined value, the second model 50 may be trained to output a low score.

The score output by the second model 50 may be used based on deciding whether to execute a command set corresponding to a user voice on the virtual machine 20.

The memory 120 may include a non-volatile memory capable of maintaining stored information even if power supply is interrupted and a volatile memory requiring continuous power supply in order to maintain stored information.

The processor 130 may be electrically connected to the memory 120 and control the overall functions and operations of the electronic apparatus 100. The processor 130 may load the bridge module 40, the first model 30 and the second model 50 from a non-volatile memory onto a volatile memory. Loading refers to an operation of loading and storing data stored in a non-volatile memory onto a volatile memory so that the processor 130 can access the data. In addition, the host operating system 10 and the virtual machine 20 may be allocated on a volatile memory.

FIG. 1 illustrates a case in which a volatile memory is included in the processor 130 as a component of the processor 130. In other words, FIG. 1 illustrates a case in which each model and module is loaded onto a volatile memory included on the processor 130. However, this is only an example, and a volatile memory may be implemented as a component separate from the processor 130.

The processor 130 may obtain a first command set corresponding to a first user voice input through the microphone 110, and execute the first command set obtained on the host operating system 10.

Specifically, the processor 130 may obtain the first command set corresponding to the first user voice by inputting the first user voice to the first model 30 on the host operating system 10. The first command (or script) set refers to a command set including at least one command for performing an operation corresponding to the first user voice, and may be a command executed through the first application.

In other words, the processor 130 may execute the first application on either the host operating system 10 or the virtual machine, and perform an operation corresponding to the first user voice by executing the first command set on the executed first application.

Based on a user command different from the first user voice being input while the first command set is executed on the host operating system, the processor 130 may identify whether the first command set can be executed on the virtual machine through the bridge module.

In this case, the fact that a user command different from the first user voice is input may include not only a case where the second user voice including a command different from the first user voice is input but also a case where a different type of command (e.g., an input of the home button for switching to the basic screen of the electronic apparatus 100, a touch of an icon for executing another application, or the like) is input.

As an example, it is assumed that a user command different from the first user voice is the second user voice different from the first user voice. Based on the second user voice being input through the microphone 110 while the first command set is executed on the host operating system 10, the processor 130 may obtain a second command set corresponding to the second user voice by inputting the second user voice to the first model 30.

Specifically, the processor 130 may obtain the second command set by inputting the second user voice input through the microphone 110 to the first model 30 on the host operating system 10. The second command set (or script) refers to a command set including at least one command for performing an operation corresponding to the second user voice. The second command set may be a command set executed through the first application just like the first command set, but is not limited thereto. In other words, the second command set may be a command set executed through a second application different from the first application.

Based on the second command set being obtained through the first model 30 while the first command set is executed on the host operating system 10, the processor 130 may stop executing the first command set through the bridge module 40.

Stopping execution of the first command set may mean changing the operation state of the first command from the state information of the first application from a running state to a stopped state. The state information of the first application may include information regarding an operation state of the first command to be executed on the first application, the number of commands included in the first command set, an index number of a command to be currently executed from the first command set, or the like.

The processor 130 may stop execution of the first command after obtaining the second command set, but is not limited thereto. Based on the second user voice being input through the microphone 110, the processor 130 may obtain the second command by inputting the second voice to the first model 30 after stopping execution of the first command through the bridge module 40, or may perform the both simultaneously.

The processor 130 may identify whether it is possible to execute the first command on the virtual machine 20 through the bridge module 40.

As an example, the processor 130 may identify whether there is a command set pre-executed on the virtual machine 20 through the bridge module 40. Based on the identification that there is a command set pre-executed on the virtual machine 20, the processor 130 may identify that the first command set cannot be executed on the virtual machine 20 through the bridge module 40.

In addition, based on execution of the command set pre-executed on the virtual machine 20 being completed, the processor 130 may execute a command that is not executed on the host operating system 10 from the first command on the virtual machine 20.

Specifically, based on execution of a command pre-executed on the virtual machine 20 being completed, the processor 130 may update the state information of the first application installed on the virtual machine 20 based on the state information of the first application installed on the host operating system 10 through the bridge module 40. In other words, the processor 130 may update the state information of the first application installed on the virtual machine 20 based on the state information of the first application installed on the host operating system 10.

For example, based on the state information of the first application installed on the host operating system 10, the processor 130 may update the type of command set to be executed by the first application from the state information of the first application installed on the virtual machine 20 to the type of command set that is not executed on the host operating system 10 from the first command set. In addition, the processor 130 may execute the command that is not executed on the host operating system through the first application from the first command set on the virtual machine 20. While the command that is not executed on the host operating system 10 from the first command set is executed on the virtual machine 20, the processor 130 may execute the second command set on the host operating system 10.

In other words, the processor 130 may execute the first command set that is not executed on the host operating system 10 on the virtual machine 20 in a background method while executing the second command set on the host operating system 10.

According to an embodiment, it is assumed that both the first command set and the second command set are command sets executed through the first application, and the processor 130 obtains the second command set corresponding to the second user voice while executing the first command set through the first application on the host operating system 10. Based on the second command set being obtained through the first model 30 while the first command set is executed on the host operating system 10, the processor 130 may identify whether the first application is executable both on the host operating system 10 and the virtual machine 20 simultaneously through the bridge module 40, and identify an area (or an operating system) from the host operating system 10 and the virtual machine 20 where each of the first command set and the second command set is to be executed based on a result of the identification.

For example, based on the identification that the first application is an application executable both on the host operating system 10 and the virtual machine 20 simultaneously, the processor 130 may decide to execute the first command set on the virtual machine 20 through the bridge module 40 and execute the second command set on the host operating system 10. In addition, the processor 130 may execute the second command set through the first application on the host operating system 10. In this case, the processor 130 may execute the command that is not executed on the host operating system 10 from the first command set through the first application on the virtual machine 20 in a background method.

However, this is only an example, and based on the identification that the first application is an application executable both on the host operating system 10 and the virtual machine simultaneously, the processor 130 may maintain execution of the first command set on the host operating system 10 through the bridge module 40, and decide to execute the second command set on the virtual machine 20. Accordingly, the processor 130 may proceed with execution of the first command set and the second command set on the host operating system 10 and the virtual machine 20 simultaneously.

As another example, based on the first application being set to be executable on other virtual machine than the virtual machine 20, the processor 130 may execute the command that is not executed on the host operating system from the first command through the first application installed on other virtual machine than the virtual machine 20 through the bridge module 40. Based on the first application being set to be un-executable on other virtual machine than the virtual machine 20, the processor 130 may identify whether another command is executed on the virtual machine 20. Based on another command being executed on the virtual machine 20, the processor 130 may execute the first command set after execution of another command is completed on the virtual machine 20.

As another example, in a case where the second command set that is executable through the first application is obtained while the first command set is executed through the first application on the host operating system 10, based on the identification that the first application is an application that cannot be executed on the host operating system 10 and the virtual machine 20 simultaneously, the processor 130 may provide a user with a message that the second command set cannot be executed through the first application on the virtual machine 20.

As another example, in a case where the second command set that can be executed through the first application is obtained while the first command set is executed through the first application on the host operating system 10, based on the identification that the first application cannot be executed on the host operating system 10 and the virtual machine 20 simultaneously, the processor 130 may initiate execution of the second command set after execution of the first command set through the first application on the host operating system 10 is completed.

According to an embodiment, based on an occurrence of an event requiring a user input while the command that is not executed on the host operating system 10 from the first command is executed on the virtual machine 20, the processor 130 may provide a user with a message indicating the occurred event through the bridge module 40.

According to an embodiment, there may occur an event requiring user authentication while the command that is not executed on the host operating system 10 from the first command set is executed through the first application on the virtual machine 20. The first command set may include a command requiring user authentication (e.g., biometric authentication, user authentication according to password input, user authentication using various authentication data, or the like).

Based on an event requiring user authentication occurring, the processor 130 may control to provide a message requiring user authentication on the host operating system 10 through the bridge module 40. For example, the processor 130 may display a user interface (UI) including a message requiring user authentication information for executing the first command set through the bridge module 40 or may output it in the form of a voice.

Based on information capable of authenticating a user being input from the user, the processor 130 may control to provide the information capable of authenticating the user through the bridge module 40 on the virtual machine 20. In addition, the processor 130 may execute the remaining commands from the first command set using the information capable of authenticating the user on the virtual machine 20.

According to another embodiment, there may occur an event where an external website cannot be connected while the command that is not executed on the host operating system 10 from the first command set is executed through the first application on the virtual machine 20. The first command set may include a command requiring an access to an external site. However, due to various issues, such as network connection problems or excessive traffic of external sites, there may be a problem that an access to an external website is not possible.

Based on an event where it being impossible to access an external website occurs, the processor 130 may control to provide a message inquiring the user's intention related to the inability to access the external website on the host operating system 10 through the bridge module 40. Based on receiving a command to retry or stop accessing the external website from the user, the processor 130 may control to provide the received user command to the virtual machine 20 through the bridge module 40. The processor 130 may retry or stop accessing the external website based on the user command on the virtual machine 20.

Meanwhile, based on the second user voice being input through the microphone 110 while the first command set is executed on the host operating system 10, the processor 130 may obtain the second command set corresponding to the second user voice by inputting the second user voice to the first model 30, and obtain a score indicating the degree of urgency of execution of the second command by inputting the second command set to the second model 50.

For example, based on the obtained score exceeding a threshold value, the processor 130 may decide to stop executing the first command set on the host operating system 10 through the bridge module 40 and execute the second command set. In this case, the processor 130 may identify whether it is possible to execute the command that is not executed on the host operating system 10 from the first command set on the virtual machine 20 through the bridge module 40. Since the process of identifying whether it is possible to execute the first command set on the virtual machine 20 through the bridge module 40 was described above, overlapping description will be omitted.

As another example, based on the obtained score being equal to or less than a predetermined value, the processor 130 may execute the second command set after execution of the first command is completed on the host operating system 10. In other words, based on the second user voice being input through the microphone 110 while the first command set is executed on the host operating system 10, the processor 130 may identify the degree of urgency of execution of the second command corresponding to the second user voice using the second model 50 through the bridge module 40, and decide whether to execute the second command set after stopping execution of the first command set on the host operating system 10 or execute the second command set on the host operating system 10 after execution of the first command set is completed based on a result of the identification.

According to an embodiment, based on the second command set corresponding to the second user voice being obtained as the second user voice is input while the first command set is executed, the processor 130 may identify whether it is possible to execute the first command set on the virtual machine 20 or obtain a score corresponding to the second command set using the second model 50 through the bridge module 40. The embodiment thereof will be described later.

Meanwhile, according to another embodiment, the processor 130 may determine a priority for executing command sets by comparing scores corresponding to each of the first command set and the second command set, obtained through the second model 50.

Specifically, the processor 130 may obtain the first command set through the first model 30 on the host operating system 10, and score a first score corresponding to the first command set by inputting the first command set to the second model 50. In this case, the first score may be a score indicating the degree of urgency of execution of the first command set. Based on the second user voice being input while the first command set is executed, the processor 130 may obtain the second command set by inputting the second user voice to the first model 30, and obtain a second score corresponding to the second command set by inputting the second command set to the second model 50.

Based on the first score being greater than the second score, it may mean that the priority of execution of the first command set is greater than the priority of execution of the second command set. Accordingly, the processor 130 may maintain execution of the first command set on the host operating system 10, and execute the second command set on the virtual machine 20.

On the contrary, based on the second score being greater than the first score, it may mean that the priority of execution of the second command set is greater than the priority of execution of the first command set. Accordingly, the processor 130 may execute the second command set on the host operating system 10 and execute the command that is not executed on the host operating system from the first command set on the virtual machine 20.

Meanwhile, based on execution of the command that is not executed on the host operating system 10 from the first command set being completed on the virtual machine 20, the processor 130 may update the state information of the first application installed on the host operating system 10. Specifically, the processor 130 may provide information that execution of the first command set has been completed on the host operating system 10 through the first application installed on the virtual machine 20 through the bridge module 40. The processor 130 may update information regarding the first application installed on the host operating system 10 based on information that execution of the first command set has been completed on the virtual machine 20.

The function related to artificial intelligence according to an embodiment is operated through the processor 130 and the memory 120. The processor 130 may consist of one or multiple processors. In this case, the one or multiple processors may be a general-purpose processor, such as a central processing unit (CPU), an application processor (AP), a digital signal processor (DSP), or the like, a graphics-only processor, such as graphics processing unit (GPU) and a vision processing unit (VPU), or an AI-only processor, such as neural processing unit (NPU).

The one or multiple processors 130 control to process input data according to pre-defined operation rules or artificial intelligence models stored in the memory 120. Alternatively, based on the one or multiple processors being an AI-only processor, the AI-only processor may be designed in a hardware structure specialized for processing a specific artificial intelligence model.

The predefined operation rules or artificial intelligence models are characterized by being created through training. Here, the creation through the training means that predefined operation rules or artificial intelligence models set to perform a desired characteristic (or purpose) are created by training a basic artificial intelligence model using a plurality of training data by a training algorithm. Such training may be performed in an apparatus itself on which the artificial intelligence according to the disclosure is performed or may be performed through a separate server and/or system.

Examples of the learning algorithm include supervised learning, unsupervised learning, semi-supervised learning, or reinforcement learning, but are not limited thereto.

The artificial intelligence model includes a plurality of artificial neural networks, and the artificial neural network may include a plurality of neural network layers. Each of the plurality of neural network layers has a plurality of weight values, and performs a neural network calculation through a calculation between a calculation result of a previous layer and the plurality of weights. The plurality of weights of the plurality of neural network layers may be optimized by a training result of the artificial intelligence model. For example, the plurality of weights may be updated so that a loss value or a cost value obtained from the artificial intelligence model during a training process is decreased or minimized.

Examples of the artificial neural network include a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-Networks, and the like, and the artificial neural network in the disclosure is not limited to the example described above except for a case where it is specified.

Figure 2:
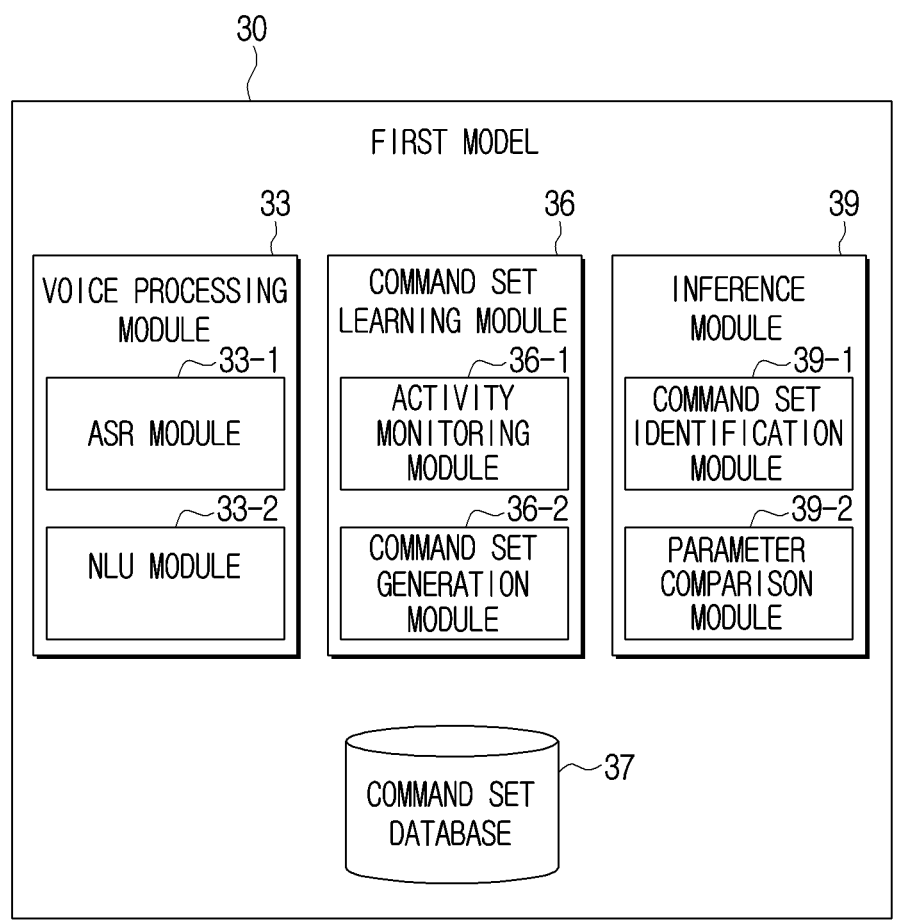
FIG. 2 is a view illustrating a structure of a first model of an electronic apparatus according to an embodiment of the disclosure.

FIG. 2 is a view illustrating a process and a structure in which a first model is trained according to an embodiment of the disclosure.

Referring to FIG. 2, the first model 30 may include a voice processing module 33, a command set learning module 36 and an inference module 29. The first model 30 may include a command set database 37 including a command set matched with a plurality of user voices. However, this is only an example, and software configuration and data of a level obvious to those skilled in the art may be further included in the first model 30.

The voice processing module 33 may include an auto speech recognition (ASR) module 33-1 that recognizes a user voice and outputs a text corresponding to the user voice and a natural language understanding (NLU) module 33-2 that classifies the output domain and identifies the meaning of the text by identifying the intent of the text. Based on a user voice being input to the first model 30, the ASR module 33-1 may output a text corresponding to the input user voice, and the NLU module 33-2 may identify the meaning of the output text.

Meanwhile, even if the meaning of the text corresponding to a user voice is identified, based on a command set for executing an operation corresponding to the user voice being not pre-learned, the first model 30 may not output a command set corresponding to the user voice. In this case, the electronic apparatus 100 may the user with a message requiring an input of an interaction to train or execute a command set for executing an operation corresponding to the user voice.

The command set learning module 36 refers to a module that is trained to output a command set corresponding to a user voice input to the first model 30. The command set learning module 36 may include an activity monitoring module 36-1 that monitors various interactions (e.g., touch, text input, swipe, or the like) input from a user and a command set generation module 36-2 that generates a command set corresponding to an interaction input from a user and matches the command set to a user voice.

The command set learning module 36 may train the first model 30 to output the first command set corresponding to the first user voice. Specifically, the activity monitoring module 36-1 may monitor an interaction that is input in response to a message provided to train a command set corresponding to an operation corresponding to the first user voice.

The command set generation module 36-2 may generate the first command set consisting of a plurality of commands capable of executing an operation according to an interaction input form a user, and match the generated first command set to the first user voice. The command set generation module 36-2 may update the first command set matched to the first user voice in the command set database 37. In addition, based on the first user voice being input to the first model 30, the command set learning module 36 may train an inference module 39 to output the first command set based on data included in the command set database 37.

For example, the activity monitoring module 36-1 may monitor an interaction input from a user in response to a message requiring an input of an interaction corresponding to an operation corresponding to the first user voice that 'send a message to my wife that I am a little late today.' For example, the activity monitoring module 36-1 may monitor an input of i) an interaction that executes a messenger application by touching an icon of a messenger application, ii) an interaction of selecting a 'wife' chat room from among chat rooms generated on the messenger application, iii) an interaction of inputting a text that 'I am a little late today' in the chat room, and iv) an interaction of terminating execution of the messenger application.

The command set generation module 36-2 may generate the first command set including a command corresponding to each of the i) to iv) interactions. The first command set generation module 36-2 may match the first command set to the first user voice, and update the matched first command set to the command set database 37. In addition, based on the first user voice being input to the first model 30, the command set learning module 36 may train the inference module 39 to output the first command set based on data included in the command set database 37.

The inference module 39 refers to a module that is trained to output a command set corresponding to an input user voice based on the command set database 37. The inference module 39 may include a command set identification module 39-1 that identifies a command set corresponding to the input user voice from the command set database 37 and outputs the identified command set and a parameter comparison module 39-2 that compares parameters between the input user voice and the pre-learned voice and identifies a command set according thereto.

The parameter comparison module 39-2 may identify a case in which a sentence corresponding to a newly input voice and a sentence corresponding to a pre-learned voice have the same meaning based on a representative parameter being excluded. The representative parameter may mean a named entity included in a voice or a word representing an object or a target in a sentence corresponding to the voice. For example, in the case of the sentence that 'send a message to my wife that I am a little late today', which corresponds to the voice stored in the command set database 37 and learned by the first model 30 and the sentence that 'send a message to my friend that I am a little late today', which corresponds to a new voice, the meaning of each sentence is the same except the representative parameter of 'wife' and 'friend.'

Based on the identification that the sentence corresponding to the newly input voice and the sentence corresponding to the pre-learned voice have the same meaning except the representative parameter through the parameter comparison module 39-2, the command set identification module 39-1 may identify a command set corresponding to the pre-learned voice from the command set database 37. In addition, the parameter comparison module 39-2 may change 'wife' that is the parameter included in the identified command set to 'friend', and output a command set in which the parameter is changed.

Figure 3:
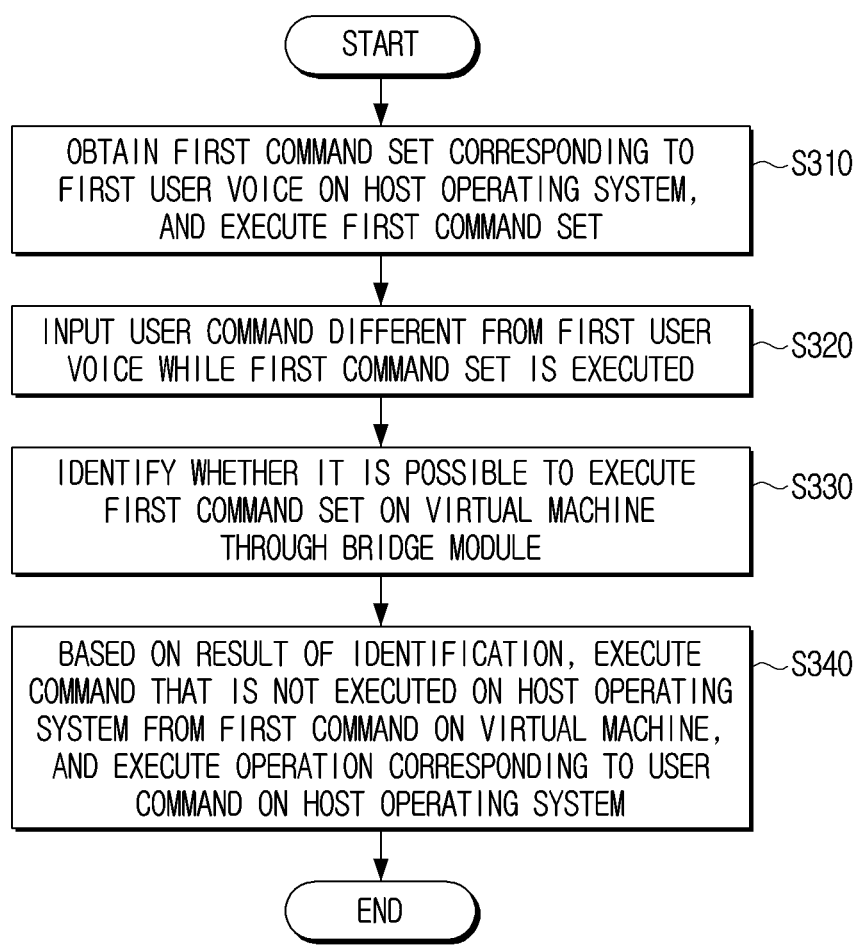
FIG. 3 is a flowchart illustrating a controlling method of an electronic apparatus according to an embodiment of the disclosure.

FIG. 3 is a view illustrating a controlling method of an electronic apparatus according to an embodiment of the disclosure.

Referring to FIG. 3, the electronic apparatus 100 may obtain the first command set corresponding to the first user voice on the host operating system, and execute the obtained first command set at operation S310. The electronic apparatus 100 may obtain the first command set corresponding to the first user voice by inputting the first user voice to the first model 30 on the host operating system.

While the first command set is executed, the electronic apparatus 100 may receive a user command different from the first user voice at operation S320. The user command may be the second user voice different from the first user voice, but is not limited thereto. The user command may be implemented in various ways, such as a user command for executing other applications, a home button input for switching to a home screen, or the like.

The electronic apparatus 100 may identify whether it is possible to execute the first command set on the virtual machine through the bridge module at operation S330. For example, the electronic apparatus 100 may identify whether there is a command set that is being pre-executed on the virtual machine. The embodiment thereof will be described with reference to FIG. 4.

As another example, based on the first and second command sets being executed through the first application, the electronic apparatus 100 may identify whether it is possible to execute the first command set on the virtual machine by identifying whether it is possible to execute the first application on the host operating system and on the virtual machine simultaneously through the bridge module. The embodiment thereof will be described with reference to FIG. 5.

Based on a result of the identification, the electronic apparatus 100 may execute the command that is not executed on the host operating system from the first command on the virtual machine, and execute an operation corresponding to a user command on the host operating system at operation S340. Meanwhile, an event requiring a user input may occur while the command that is not executed on the host operating system from the first command set is executed on the virtual machine. The embodiment thereof will be described with reference to FIG. 8.

Meanwhile, the electronic apparatus 100 may obtain a score corresponding to a user voice through the second model 50, and execute a command set corresponding to the user voice on at least one of the host operating system and the virtual machine. The embodiment thereof will be described with reference to FIGS. 6 and 7.

Figure 4:
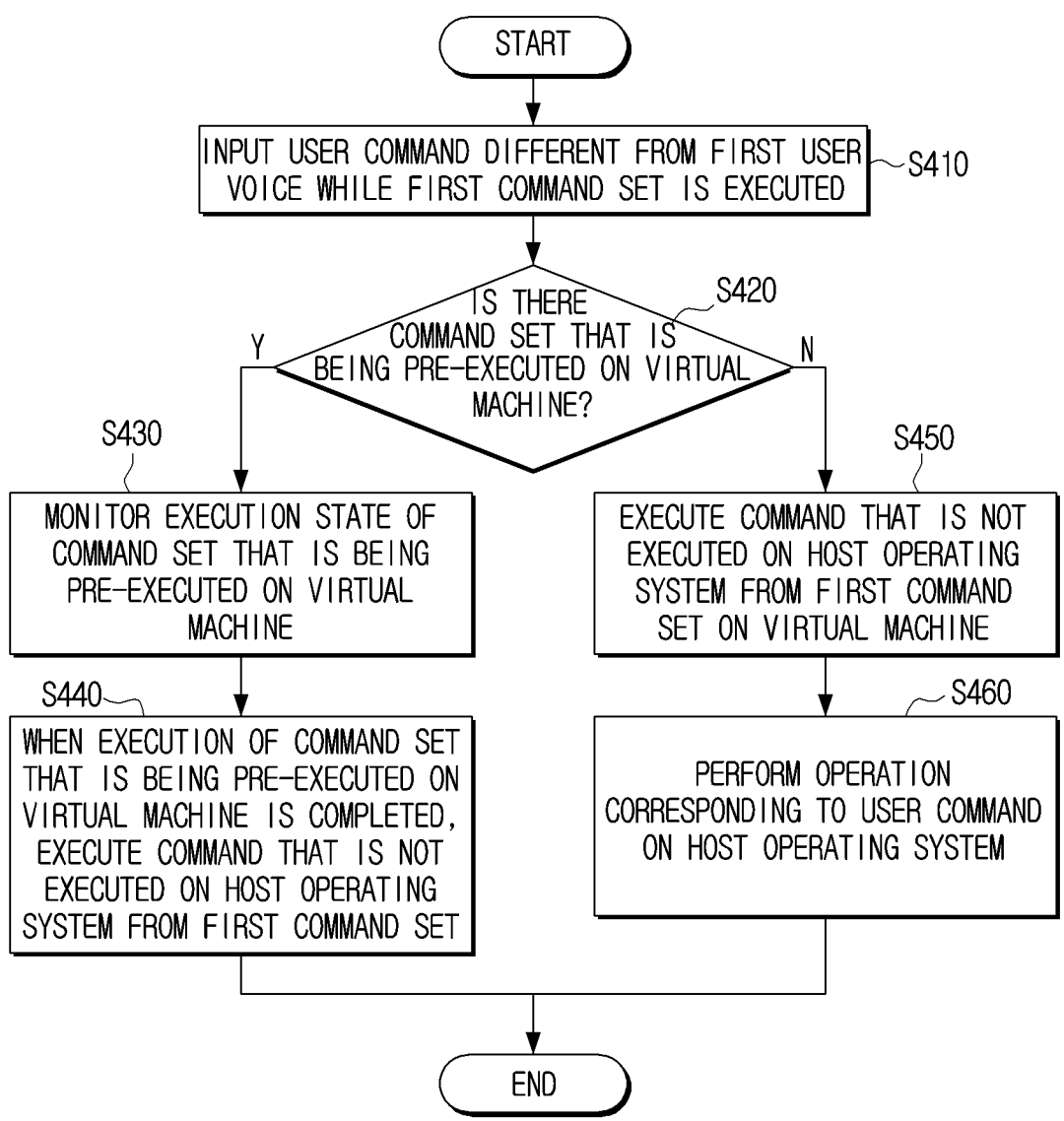
FIG. 4 is a flowchart illustrating an operation of an electronic apparatus when a different user command is input while a first command set is executed according to an embodiment of the disclosure.

FIG. 4 is a flowchart illustrating an operation of an electronic apparatus based on a different user command being input while a first command set is executed according to an embodiment of the disclosure. Meanwhile, FIG. 4 illustrates an operation subsequent to operation S310 of FIG. 3.

Referring to FIG. 4, the electronic apparatus 100 may receive a user command different from the first user voice while the first command set is executed on the host operating system at operation S410. The electronic apparatus 100 may identify whether there is a command set that is being pre-executed on the virtual machine at operation S420. The electronic apparatus 100 may identify whether there is a command set that is being pre-executed on the virtual machine while the first command set is executed on the host operating system, but is not limited thereto. The electronic apparatus 100 may stop execution of the first command set and identify whether there is a command set that is being pre-executed on the virtual machine.

Based on the identification that there is a command set that is being pre-executed on the virtual machine, the electronic apparatus 100 may identify that the first command set cannot be executed currently on the virtual machine. The electronic apparatus 100 may monitor the execution state of the command set that is being pre-executed on the virtual machine at operation S430. Based on execution of the command set that is being pre-executed on the virtual machine being completed, the electronic apparatus 100 may execute the command that is not executed on the host operating system from the first command set on the virtual machine at operation S440.

Based on the identification that no command set is being pre-executed on the virtual machine, the electronic apparatus 100 may identify that the first command set can be executed on the virtual machine. The electronic apparatus 100 may execute the command that is not executed on the host operating system from the first command set on the virtual machine at operation S450. The electronic apparatus 100 may perform an operation corresponding to a user command on the host operating system at operation S460. Meanwhile, operations S450 and S460 may be performed simultaneously, or may be performed regardless of order.

Figure 5:
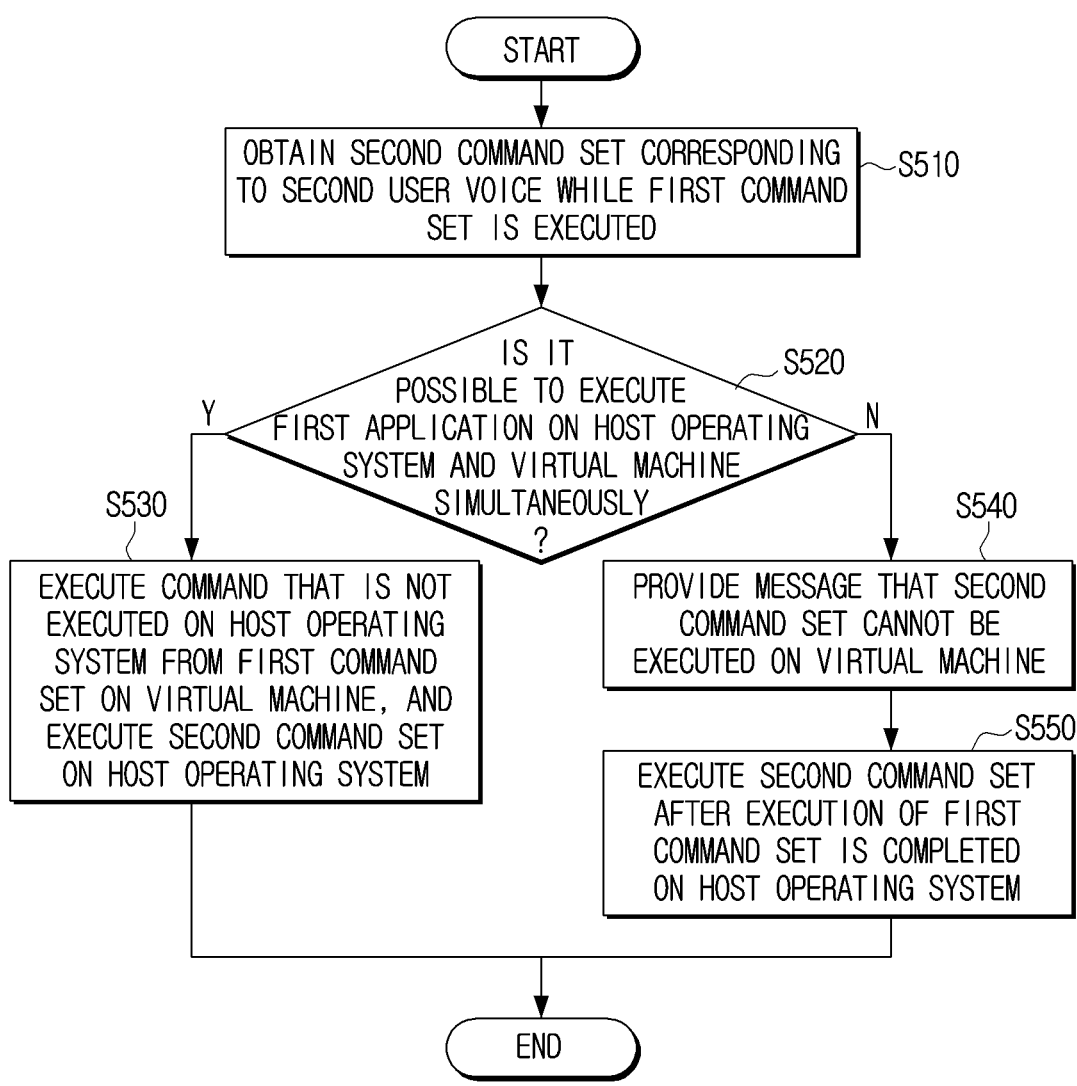
FIG. 5 is a flowchart illustrating an operation of an electronic apparatus when a different user command is input while a first command set is executed according to an embodiment of the disclosure.

FIG. 5 is a flowchart illustrating an operation of an electronic apparatus based on a different user command being input while a first command set is executed according to an embodiment of the disclosure. Meanwhile, FIG. 5 illustrates an operation subsequent to operation S310 of FIG. 3.

Referring to FIG. 5, the electronic apparatus 100 may obtain a second command set corresponding to a second user voice while the first command set is executed at operation S510. Based on the second user voice being input, the electronic apparatus 100 may obtain the second command set corresponding to the second user voice by inputting the second user voice to the first model 30. The first and second command sets may be command sets that can be executed through the first application.

The electronic apparatus 100 may identify whether the first application can be executed on the host operating system and the virtual machine simultaneously at operation S520. For example, the electronic apparatus 100 may identify whether the first application is an application that is set to be executed on the host operating system and the virtual machine simultaneously.

Based on the identification that the first application can be executed on the virtual machine and the host operating system simultaneously, the electronic apparatus 100 may execute the command that is not executed on the host operating system from the first command set on the virtual machine, and execute the second command set on the host operating system at operation S530. Meanwhile, according to another embodiment, when a user sets a command set regarding the first application to be executed on a first virtual machine from among a plurality of virtual machines, the electronic apparatus 100 may execute the command that is not executed on the host operating system from the first command on the first virtual machine.

Based on the identification that it is not possible to execute the first application on the virtual machine and the host operating system simultaneously, the electronic apparatus 100 may provide a message that the second command set cannot be executed on the virtual machine at operation S540. The electronic apparatus 100 may monitor the command set executed on the host operating system while the message is provided. Based on execution of the first command set being completed on the host operating system, the electronic apparatus 100 may execute the second command set at operation S550.

Figure 6:
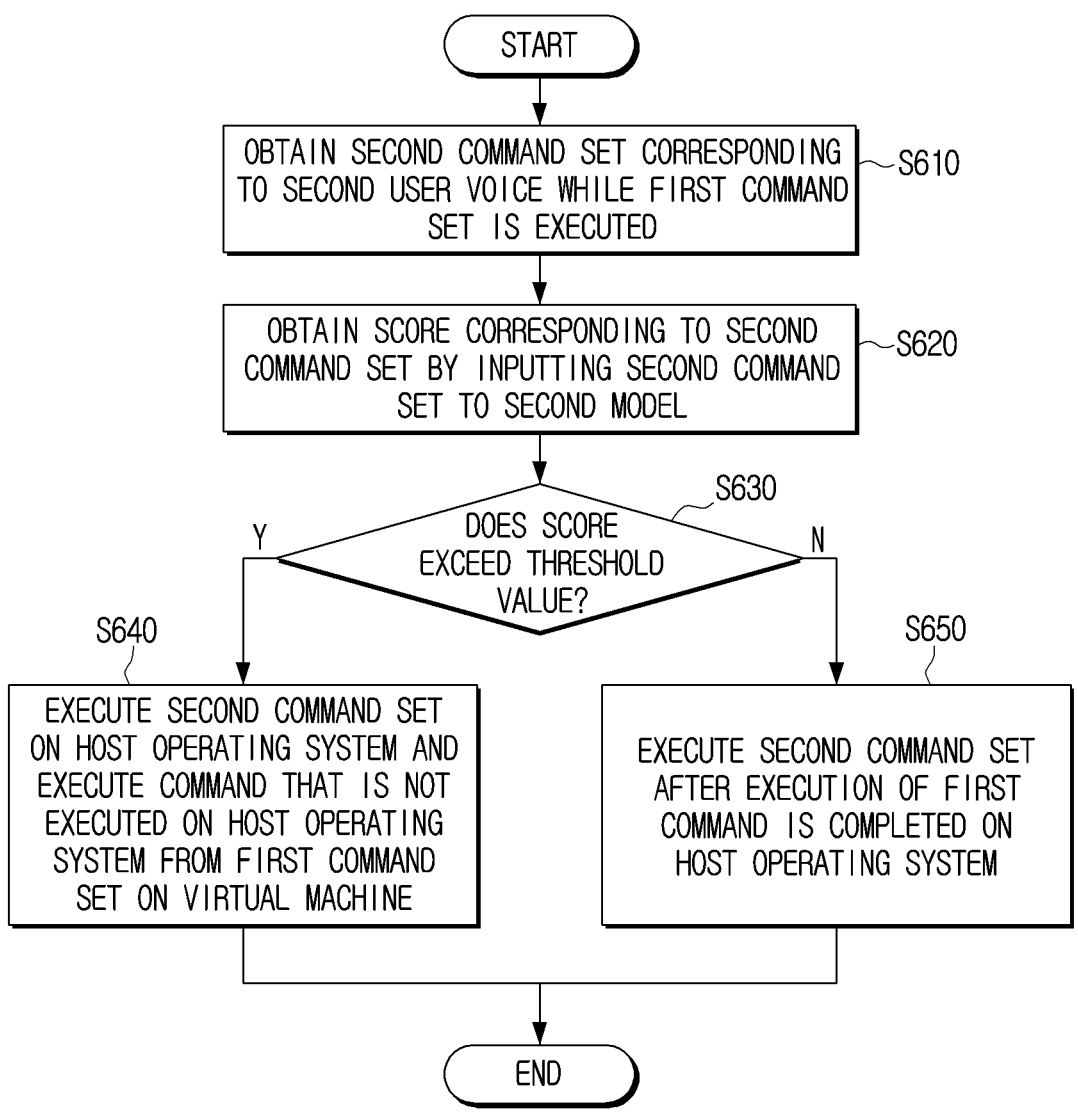
FIGS. 6 and 7 are flowcharts illustrating a process in which an electronic apparatus performs various operations through a second model according to various embodiments of the disclosure.

FIG. 6 is a flowchart illustrating a process in which an electronic apparatus performs various operations through a second model 50 according to an embodiment of the disclosure. FIG. 6 illustrates an operation subsequent to operation S310 of FIG. 3.

Referring to FIG. 6, the electronic apparatus 100 may obtain the second command set corresponding to the second user voice while the first command is executed at operation S610. The second command set described with reference to FIG. 6 may be a command set that is executed in an application different from or same as the first command.

The electronic apparatus 100 may obtain a score corresponding to the second command set by inputting the second command set to the second model 50 at operation S620. The score corresponding to the second command set means a score indicating the degree of urgency of execution of the second command set. The electronic apparatus 100 may identify whether the obtained score exceeds a threshold value at operation S630. Here, the threshold value may be a predetermined value, but may be changed freely by a user.

The fact that the score exceeds a threshold value may mean that execution of the second command set is urgent. Based on the score exceeding a threshold value, the electronic apparatus 100 may execute the second command set on the host operating system and execute the command that is not executed on the host operating system from the first command set on the virtual machine at operation S640. However, this is merely an example, and the electronic apparatus 100 may maintain execution of the first command set on the host operating system and execute the second command set on the virtual machine.

Meanwhile, the first and second command sets are command sets executed in the first application, and based on the first application being an application that can be executed on the host operating system and the virtual machine simultaneously, the electronic apparatus 100 may first execute the second command set on the host operating system and then execute the command that is not executed from the first command set.

The fact that the score is equal to or less than a threshold value may mean that execution of the second command set is relatively not urgent. Based on the score being equal to or less than a threshold value, the electronic apparatus 100 may execute the second command set after execution of the first command set is completed on the host operating system at operation S650. In other words, since execution of the second command set is not urgent, the electronic apparatus 100 may start executing the second command set after completing execution of the first command set that is being pre-executed on the host operating system.

Figure 7:
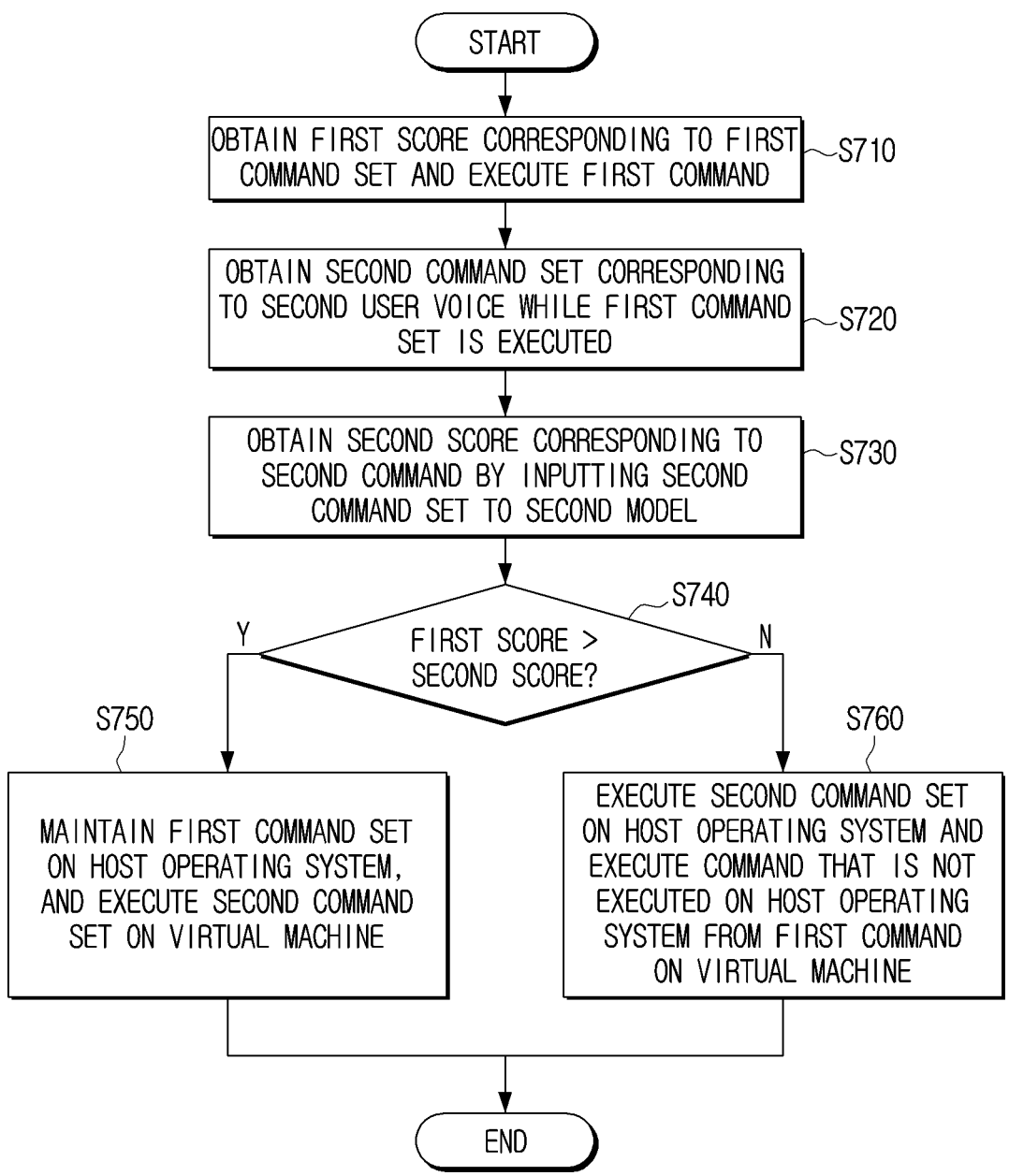

FIG. 7 is a flowchart illustrating a process in which an electronic apparatus performs various operations through a second model according to an embodiment of the disclosure.

Referring to FIG. 7, based on the first user voice being input, the electronic apparatus 100 may obtain the first command set corresponding to the first user voice by inputting the first user voice to the first model 30. The electronic apparatus 100 may obtain the first score corresponding to the first command set and execute the first command set at operation S710. The electronic apparatus 100 may obtain the first score by inputting the first command set to the second model 50 and execute the first command set. However, this is only an example, and the electronic apparatus 100 may obtain the first score while the first command set is executed, or it can proceed regardless of order.

Based on the second user voice being input, the electronic apparatus 100 may obtain the second command set corresponding to the second user voice while the first command set is executed at operation S720. The electronic apparatus 100 may obtain the second score corresponding to the second command set by inputting the second command set to the second model 50 at operation S730.

The electronic apparatus 100 may compare the first score and the second score and identify which score is greater at operation S740. The fact that the first score is greater than the second score may mean that execution of the first command set is more urgent than execution of the second score. Based on the first score being greater than the second score, the electronic apparatus 100 may maintain execution of the first command set on the host operating system and execute the second command set on the virtual machine at operation S750. However, this is only an example, and the electronic apparatus 100 may execute the second command set after execution of the first command set is completed on the host operating system.

The fact that the second score is greater than the first score may mean that execution of the second command set is more urgent than execution of the first command set. Based on the second score being greater than the first score, the electronic apparatus 100 may execute the second command set on the host operating system and execute the command that is not executed on the host operating system from the first command set on the virtual machine at operation S760. However, this is only an example, and the electronic apparatus 100 may maintain execution of the first command set on the host operating system and execute the second command set on the virtual machine.

Figure 8:
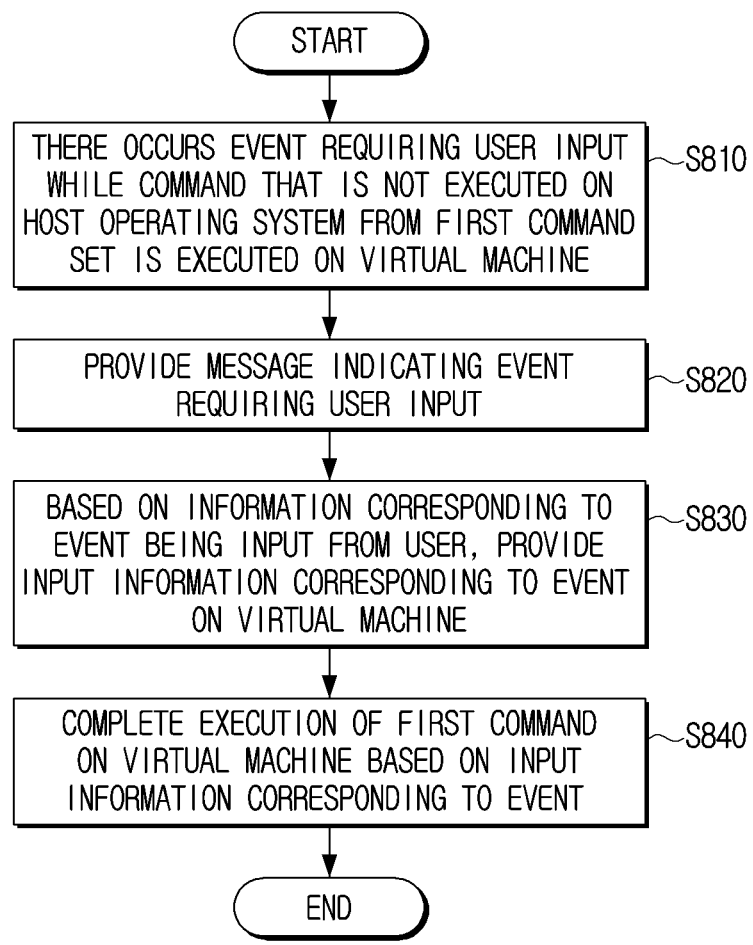
FIG. 8 is a view illustrating an operation of an electronic apparatus when an event requiring a user input occurs while a first command set is executed according to an embodiment of the disclosure.

FIG. 8 is a view illustrating an operation of an electronic apparatus based on an event requiring a user input occurring while a first command set is executed according to an embodiment of the disclosure. FIG. 8 illustrates an operation subsequent to operation S340.

Referring to FIG. 8, in the electronic apparatus 100, an event requiring a user input may occur while the command that is not executed on the host operating system from the first command set is executed on the virtual machine at operation S810. The fact that an event requiring a user input occurs may mean that only based on specific information being input from the user, execution of the first command set is completed. Accordingly, based on an event requiring a user input occurring, the electronic apparatus 100 may stop execution of the first command set on the virtual machine.

An event requiring a user input may include, for example, an event requiring user authentication (e.g., biometric authentication, user authentication according to password input, user authentication using various authentication data, or the like), an event requiring user confirmation regarding an access to an external website, or the like.

The electronic apparatus 100 may provide a message indicating an event requiring a user input on the host operating system at operation S820. For example, the electronic apparatus 100 may display a UI including a message requesting a user input in order to execute the first command set executed on the virtual machine or output the UI in the form of a voice.

Based on information corresponding to an event being input from a user, the electronic apparatus 100 may provide the input information corresponding to the event on the virtual machine at operation S830. The information corresponding to the event may be implemented in various ways according to the type of event. For example, the electronic apparatus 100 may provide user authentication information input from the user or a user input that allows an access to an external website on the virtual machine.

The electronic apparatus 100 may complete execution of the first command set based on information corresponding to an event input on the virtual machine at operation S840. In other words, based on an event requiring a user input occurring and execution of the first command set being stopped on the virtual machine, the electronic apparatus 100 may resume executing of the first command set using the information regarding the input information corresponding to the event.

Figure 9:
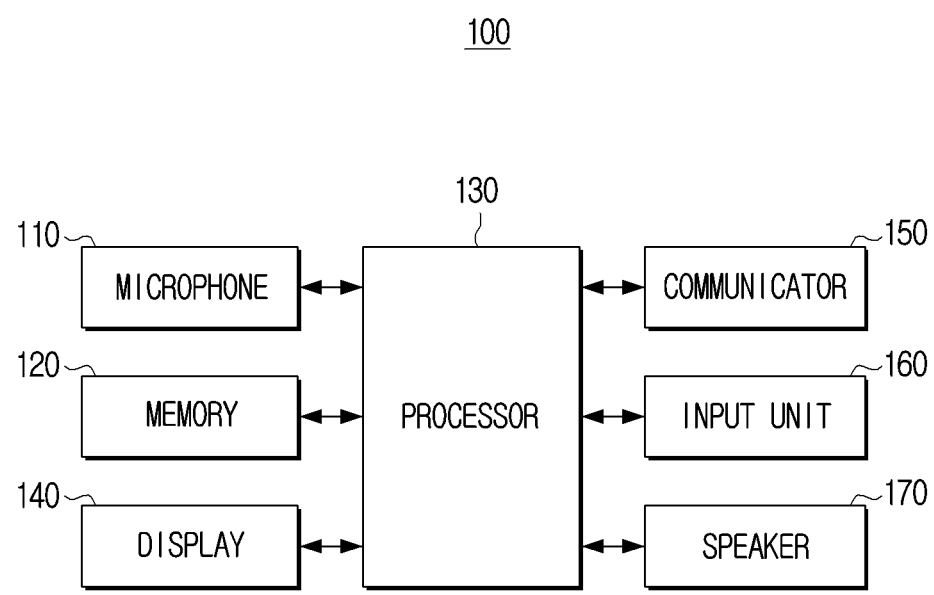
FIG. 9 is a block diagram illustrating configuration of an electronic apparatus according to an embodiment of the disclosure.

FIG. 9 is a block diagram illustrating configuration of an electronic apparatus according to an embodiment of the disclosure.

Referring to FIG. 9, the electronic apparatus 100 may include the microphone 110, the memory 120, the processor 130, a display 140, a communicator 150, an input unit 160, and a speaker 170. As the microphone 110, the memory 120 and the processor 130 have been described with reference to FIG. 1, overlapping descriptions will be omitted.

The display 140 may display various pieces of information under the control of the processor 130. In particular, the display 140 may display an operation screen according to execution of a command set through an application. For example, the display 140 may display an operation screen corresponding to a command set that is being executed on the host operating system. The command set that is being executed on the virtual machine operates in a background method and thus, based on execution of the command set being completed on the virtual machine, the display 140 may display a message indicating that execution of the command set corresponding to a specific operation is completed on the virtual machine. In addition, the display 140 may display a message indicating an event requiring a user input or a UI screen including the message.

The display 140 may be implemented as a touch screen together with a touch panel, or it may be implemented as a flexible display.

The communicator 150 includes a circuit, and may perform communication with an external device. In this case, the communication connection with an external device by the communicator 150 may be performed through a third device (e.g., a repeater, a hub, an access point, a server, a gateway, or the like).

The communicator 150 may include various communication modules to perform communication with an external device. For example, the communicator 150 may include a wireless communication module, and for example, may include a cellular communication module using at least one of 5$^{th}$ generation (5G), long-term evolution (LTE), LTE advanced (LTE-A), code division multiple access (CDMA), wideband CDMA (WCDMA), and the like.

As another example, the wireless communication module may include at least one of, for example, wireless fidelity (Wi-Fi), Bluetooth, Bluetooth low energy (BLE), Zigbee, radio frequency (RF), or a body area network (BAN). However, this is only one embodiment, and the communicator 150 may include a wired communication module.

The communicator 150 may transmit a command input from a user, or the like, to a server that manages various applications. For example, the communicator 150 may transmit a sentence input from a user to a server that manages a messenger application. A sentence input from a user being input to a specific chat room may include the process of the sentence input from the user being transmitted to a server that manages the messenger application and the server inputting the transmitted sentence to the specific chat room.

The input unit 160 includes a circuit, and may receive a user input for controlling the electronic apparatus 100. In particular, the input unit 160 may include a touch panel for receiving a user touch using the user's hand, a stylus pen, or the like, a button for receiving a user manipulation, or the like. As another example, the input unit 160 may be implemented as a different input device (e.g., a keyboard, a mouse, a motion input unit, or the like). As another example, the input unit 160 may be implemented as a device (e.g., a fingerprint input module, an iris recognition module, or the like).

The speaker 170 is configured to output not only various audio data where various processing jobs, such as decoding, amplification, and noise filtering are performed by an audio processor but also various alarm sounds or voice messages.

The speaker 170 may output a message indicating an event requiring a user input in the form of a voice. The speaker 170 may output an alarm sound indicating that execution of a command is completed on the virtual machine. The speaker 170 may output a message or an alarm sound indicating that information corresponding to an event requiring a user input is input on the virtual machine.

Meanwhile, it is to be understood that the drawings accompanied in this disclosure are not intended to limit the technology described in this disclosure to specific embodiments, but include all modifications, equivalents, and/or alternatives according to embodiments of the disclosure. Throughout the accompanying drawings, similar components will be denoted by similar reference numerals.

In the disclosure, an expression "have," "may have," "include," or "may include" indicates existence of a corresponding feature (for example, a numerical value, a function, an operation, or a component, such as a part), and does not exclude existence of an additional feature.

In the disclosure, an expression "A or B," "at least one of A and/or B," or "one or more of A and/or B," may include all possible combinations of items enumerated together. For example, "A or B," "at least one of A and B," or "at least one of A or B" may indicate all of 1) a case where at least one A is included, 2) a case where at least one B is included, or 3) a case where both of at least one A and at least one B are included.

Expressions "first" or "second" used in the disclosure may indicate various components regardless of a sequence and/or importance of the components, will be used only to distinguish one component from the other components, and do not limit the corresponding components.

Based on the mention that any component (for example, a first component) is (operatively or communicatively) coupled to or is connected to another component (for example, a second component), it is to be understood that any component is directly coupled to another component or may be coupled to another component through the other component (for example, a third component). On the other hand, based on the mention that any component (for example, a first component) is "directly coupled" or "directly connected" to another component (for example, a second component), it is to be understood that the other component (for example, a third component) is not present between any component and another component.

An expression "~configured (or set) to" used in the disclosure may be replaced by an expression "~suitable for," "~having the capacity to," "~designed to," "~adapted to," "~made to," or "~capable of" depending on a situation. A term "~configured (or set) to" may not necessarily mean "specifically designed to" in hardware. Instead, in some situations, an expression "~apparatus configured to" may mean that the apparatus may "do" together with other apparatuses or components. For example, a "sub-processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

The diverse embodiments of the disclosure may be implemented by software including instructions stored in a machine-readable storage medium (for example, a computer-readable storage medium). A machine may be an apparatus that invokes the stored instruction from the storage medium and may operate according to the invoked instruction, and may include the server cloud according to the disclosed embodiments. In a case where a command is executed by the processor, the processor may directly perform a function corresponding to the command or other components may perform the function corresponding to the command under a control of the processor. The command may include codes created or executed by a compiler or an interpreter. The machine-readable storage medium may be provided in the form of a non-transitory storage medium. Here, the term "non-transitory storage medium" means that the storage medium is tangible without including a signal, and does not distinguish whether data are semi-permanently or temporarily stored in the storage medium. For example, the "non-transitory storage medium" may include a buffer in which data is temporarily stored.

According to an embodiment, the methods according to the diverse embodiments disclosed in the disclosure may be included and provided in a computer program product. The computer program product may be traded as a product between a seller and a purchaser. The computer program product may be distributed in the form of a storage medium (for example, a compact disc read only memory (CD-ROM)) that may be read by the machine or online through an application store (for example, PlayStore™). In case of the online distribution, at least a portion of the computer program product (for example, downloadable app) may be at least temporarily stored in the storage medium, such as a memory of a server of a manufacturer, a server of an application store, or a relay server or be temporarily generated.

Each of components (for example, modules or programs) according to the diverse embodiments may include a single entity or a plurality of entities, and some of the corresponding sub-components described above may be omitted or other sub-components may be further included in the diverse embodiments. Alternatively or additionally, some of the components (e.g., the modules or the programs) may be integrated into one entity, and may perform functions performed by the respective corresponding components before being integrated in the same or similar manner. Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a microphone;
   a memory configured to store at least one instruction; and
   at least one processor configured to execute the at least one instruction,
   wherein the at least one processor is further configured to:
      by executing the at least one instruction, obtain a first command set corresponding to a first user voice input through the microphone and execute the obtained first command set on a host operating system,
      based on a user command different from the first user voice being input while the first command set is executed, identify whether it is possible to execute the first command set on a virtual machine through a bridge module, and
      based on a result of identification, execute a command that is not executed on the host operating system from the first command set on the virtual machine through the bridge module and execute an operation corresponding to the user command on the host operating system.

2. The electronic apparatus of claim 1, wherein the at least one processor is further configured to:
   load a first model trained to output a command set corresponding to a user voice input through the microphone stored in the memory;
   obtain the first command set by inputting the first user voice input through the microphone to the first model on the host operating system; and
   based on the user command being a second user voice different from the first user voice input through the microphone, obtain a second command set by inputting the second user voice to the first model.

3. The electronic apparatus of claim 2, wherein the at least one processor is further configured to:
   identify whether there is a command that is being executed on the virtual machine through the bridge module;
   based on identifying that there is a command that is being executed on the virtual machine, identify that the first command set is not executable on the virtual machine; and
   based on execution of a command that is being executed on the virtual machine being completed, execute a command that is not executed on the host operating system from the first command set.

4. The electronic apparatus of claim 2,
wherein the first command set and the second command set are commands executed through a first application, and
wherein the at least one processor is further configured to:
identify whether the first application is executable on the host operating system and the virtual machine simultaneously through the bridge module, and
based on whether the first application is executable on the host operating system and the virtual machine simultaneously, decide to execute each of the command that is not executed on the host operating system from the first command set and the second command set on one of the host operating system or the virtual machine.

5. The electronic apparatus of claim 4, wherein the at least one processor is further configured to, based on identifying that the first application is executable on the host operating system and the virtual machine simultaneously, decide to execute a command that is not executed on the host operating system from the first command set on the virtual machine through the bridge module.

6. The electronic apparatus of claim 1, wherein the at least one processor is further configured to:
based on occurrence of an event requiring a user input while a command that is not executed on the host operating system from the first command set is executed on the virtual machine, provide a message indicating the event; and
based on information corresponding to the event being input from a user, control to provide the information regarding the event to the virtual machine.

7. The electronic apparatus of claim 6, wherein the at least one processor is further configured to:
based on occurrence of an event requiring user authentication from the event while a command that is not executed on the host operating system from the first command set is executed on the virtual machine, control to provide a message requesting the user authentication on the host operating system, and
based on information for authenticating the user being input from the user, control to provide the information for authenticating the user on the virtual machine.

8. The electronic apparatus of claim 2,
wherein the bridge module includes a second model trained to output a score representing a degree of urgency of command execution, and
wherein the at least one processor is further configured to:
based on a second user voice being input through the microphone while the first command set is executed, obtain a score corresponding to the second command set by inputting the second user voice to the second model through the bridge module, and
execute the second command set on the host operating system based on the obtained score.

9. The electronic apparatus of claim 8, wherein the at least one processor is further configured to:
based on the obtained score exceeding a threshold value, execute the second command set on the host operating system and execute a command that is not executed on the host operating system from the first command set on the virtual machine, and
based on the obtained score being equal to or lower than the threshold value, execute the second command set after execution of the first command is completed on the host operating system.

10. The electronic apparatus of claim 1, wherein the at least one processor is further configured to, based on execution of a command that is not executed on the host operating system from the first command set being completed on the virtual machine, update state information of an application corresponding to the first command set on the host operating system.

11. A method of controlling an electronic apparatus including a microphone, the method comprising:
obtaining a first command set corresponding to a first user voice input through the microphone on a host operating system;
based on a user command different from the first user voice being input while the first command set is executed, identifying whether it is possible to execute the first command set on a virtual machine through a bridge module; and
based on a result of the identification, executing a command that is not executed on the host operating system from the first command set on the virtual machine through the bridge module and executing an operation corresponding to the user command on the host operating system.

12. The method of claim 11, wherein the obtaining of the first command set comprises:
loading a first model trained to output a command set corresponding to a user voice input through the microphone stored in a memory;
obtaining the first command set by inputting the first user voice input through the microphone to the first model on the host operating system; and
based on the user command being a second user voice different from the first user voice input through the microphone, obtaining a second command set by inputting the second user voice to the first model.

13. The method of claim 11, wherein the identifying of whether it is possible to execute the first command set comprises:
identifying whether there is a command that is being executed on the virtual machine through the bridge module;
based on identifying that there is a command that is being executed on the virtual machine, identifying that the first command set is not executable on the virtual machine; and
based on execution of a command that is being executed on the virtual machine being completed, executing a command that is not executed on the host operating system from the first command set.

14. The method of claim 12,
wherein the first command set and the second command set are commands executed through a first application, and
wherein the identifying of whether it is possible to execute the first command set comprises:
identifying whether the first application is executable on the host operating system and the virtual machine simultaneously through the bridge module, and
based on whether the first application is executable on the host operating system and the virtual machine simultaneously, deciding to execute each of the command that is not executed on the host operating system from the first command set and the second command set on one of the host operating system or the virtual machine.

15. The method of claim 14, wherein the deciding of whether it is possible to execute the first command set comprises, based on identifying that the first application is executable on the host operating system and the virtual machine simultaneously, deciding to execute a command that is not executed on the host operating system from the first command set on the virtual machine through the bridge module.

* * * * *